United States Patent
Macgregor

[15] 3,674,049
[45] July 4, 1972

[54] AIR-TO-AIR REFUELLING HOSE REELS

[72] Inventor: Peter Stevens Macgregor, Dorset, England
[73] Assignee: Flight Refuelling Limited, London, England
[22] Filed: Sept. 18, 1970
[21] Appl. No.: 73,445

[52] U.S. Cl. .................................137/355.2, 244/135 A
[51] Int. Cl. ..............................B65h 75/34, B65h 75/30
[58] Field of Search ......................244/135 A; 137/355.2

[56] References Cited

UNITED STATES PATENTS

| | | | |
|---|---|---|---|
| 2,692,102 | 10/1954 | Cobham et al. | 244/135 A |
| 2,339,668 | 1/1944 | Baldwin et al. | 137/355.2 X |
| 2,499,909 | 3/1950 | Fox | 137/355.2 X |
| 2,514,862 | 7/1950 | Hannay | 137/355.2 |
| 2,731,171 | 1/1956 | Mankin et al. | 137/355.2 UX |
| 2,760,777 | 8/1956 | Cotton | 244/135 A |
| 2,879,017 | 3/1959 | Smith | 244/135 A |
| 2,973,163 | 2/1961 | Goodliffe et al. | 244/135 A |
| 3,061,246 | 10/1962 | Kirby | 244/135 A |
| 3,091,419 | 5/1963 | Mosher | 244/135 A |
| 3,432,121 | 3/1969 | Delaney | 244/135 A |

Primary Examiner—Samuel Scott
Attorney—Arthur B. Colvin

[57] ABSTRACT

An air-to-air refuelling system and hose reel mechanism therefor in which a constant tension spring motor is coupled to the hose reel to achieve substantially constant tension in the hose during reeling in or reeling out of the hose. Arresting means comprising a ratchet and pawl mechanism is associated with the hose reel and is actuatable in response to operation of the spring motor to provide a full trail stop facility for the hose. A feature of the invention is that a fixed displacement fuel pump (a fueldraulic motor) is coupled to a main fuel pump of the refuelling system via a hose reel control valve and is coupled to the hose reel via gearing and a sprag clutch such that the displacement pump rotates only when the hose reel is reeling out in order to effect speed limitation during reeling out. The fixed displacement pump when acting as a pump only rotates when the hose reel is reeling out but operates as a motor during rewinding of the hose reel utilizing the main fuel supply to provide rewind power.

8 Claims, 5 Drawing Figures

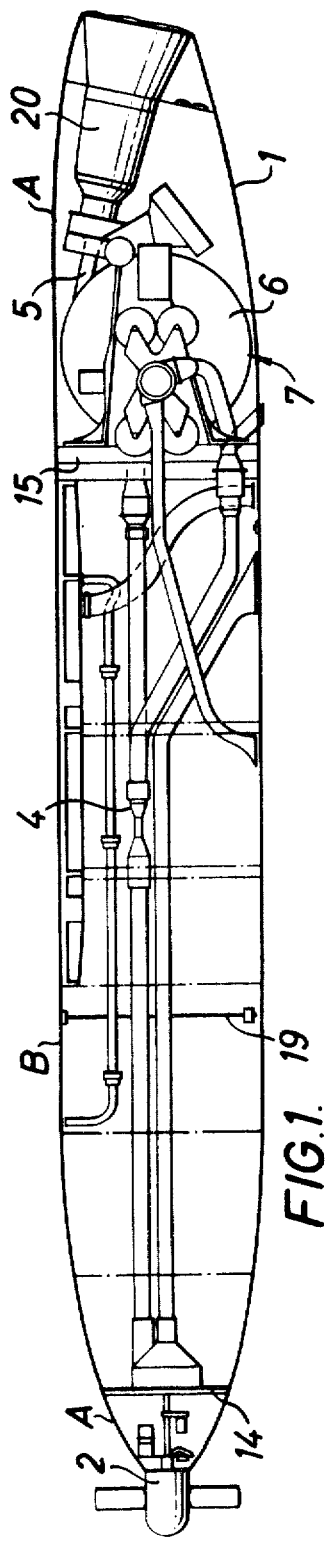
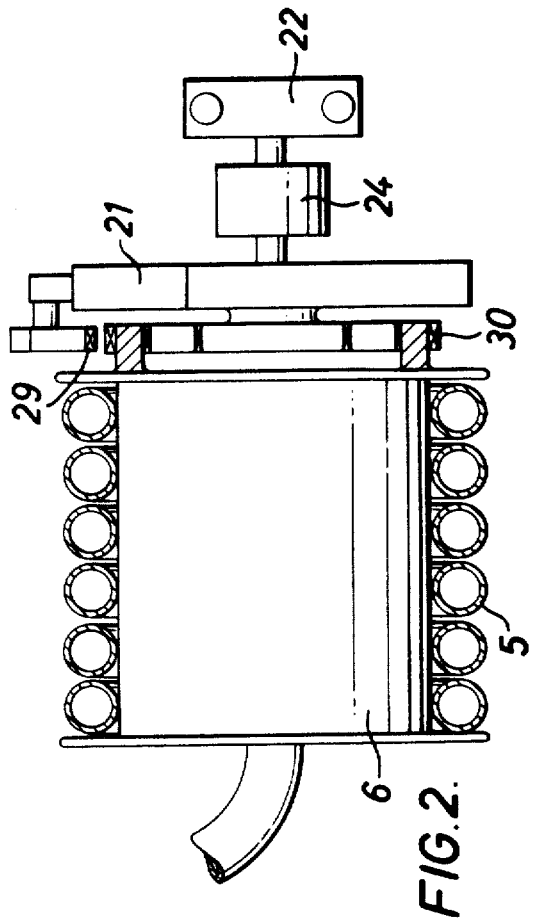
FIG.1.
FIG.2.
INVENTOR
PETER S. MACGREGOR
BY
ATTORNEY

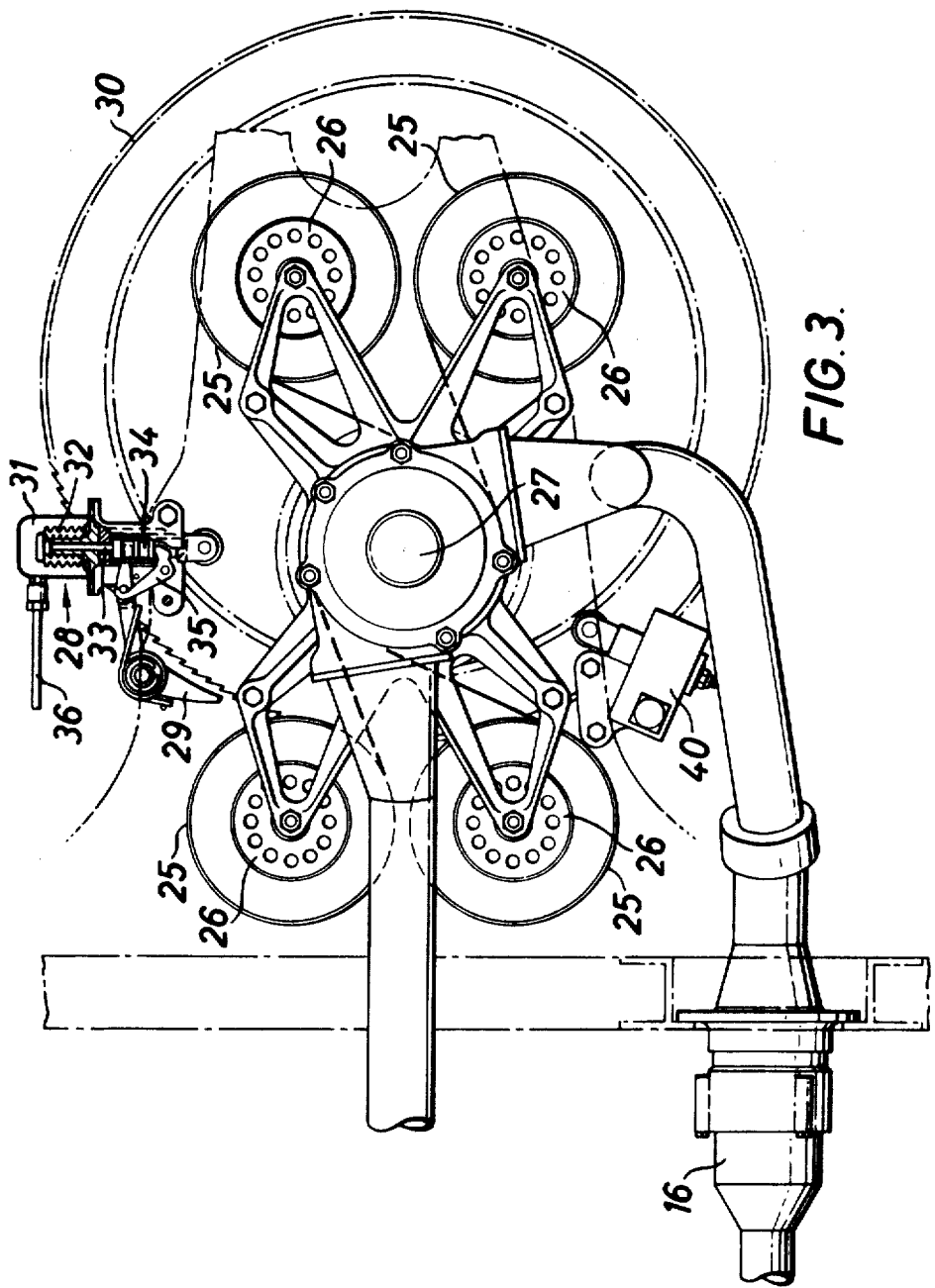

AIR-TO-AIR REFUELLING HOSE REELS

This invention relates to air-to-air refueling systems and hose reel mechanism therefor, and particularly to means for achieving substantially constant tension in a hose trailed from an air-to-air refuelling hose reel.

The traditional method of achieving such substantially constant tension is to provide power to the reel via an hydraulic drive. However, in service, a proportion of failures can be attributed to faults within the hydraulic system and failures in the power source.

An object of the present invention is to provide means for achieving substantially constant tension in a hose trailed from an air-to-air refueling hose reel, which can operate without external power or hydraulic transmission such as to provide a substantial gain in reliability and a reduction in the servicing time required.

A more specific object of the invention is to provide means whereby an air-to-air refuelling hose reel embodied in a self-contained aircraft refuelling pod may be operated by a simple mechanical spring system without external power or hydraulic transmission.

Prior to a receiver aircraft making a refuelling contact, the hose is fully extending to a full trail stop and is held in this position by the drag of the hose and drogue which is in excess of the rewind effort of the hose reel. This rewind effort is sufficient to accelerate the mass of the hose and reel and overcome the drag of the hose when the receiver aircraft makes contact and accepts the drag of the drogue. During contact, the tension in the hose will be due to the hose reel effort, and the reaction on the receiver probe will be the difference between the hose and drogue drag and hose tension. The receiver aircraft is free to move the hose on or off the hose reel by moving forwards or backwards relative to the tanker aircraft at speeds not normally exceeding 3 to 5ft./sec. It is desirable to limit the pay-out speed of the reel such that any rapid deceleration of the receiver aircraft will effect an emergency disconnection, leaving the receiver aircraft free to take avoiding action in the event of an emergency. This provision also prevents damage to the full trail stop due to excessive pay-out speeds.

In order to rewind the hose at the conclusion of a refuelling operation, the hose reel effort must exceed the drag of the hose and drogue. Due to potential instability when the drogue is close to its stowage, it is desirable to limit the rewind speed to a maximum of 3ft./second. The drogue is normally collapsible and stows in a tunnel in the tanker aircraft. It is necessary to maintain hose tension or apply a parking brake when the drogue is stowed. The drogue is held in the stowed position by hose tension as well as a ratchet type parking brake.

To deploy the hose to the full trail position, it is necessary initially to release the parking brake and remove the hose tension such that the drogue can be ejected from its tunnel and deployed. Once this is done, it is necessary to provide hose reel effort to restrain the drogue drag from accelerating the hose reel to a dangerous pay-out speed. The trail is complete when the hose reaches its full trail stop. To effect such initial deployment, hose tension is removed, the parking brake is released and a buffer spring ejects the drogue from its tunnel. A shock-absorbed full trail stop is provided.

A hose reel system thus requires the following basic elements:

a. A drive providing a constant predetermined tension whether reeling in or out with a minimum predetermined response speed when reeling in;
b. A full trail stop, preferably mechanical incorporating shock absorption;
c. A predetermined speed limitation when reeling out;
d. A power source to provide a total predetermined hose tension for hose rewind at a predetermined maximum speed;
e. Means for holding the drogue in the stowed position, and
f. Means for ejecting the drogue from the stowed position.

According to one aspect of the present invention there is provided an air-to-air refuelling hose reel system wherein a constant tension spring motor is arranged to be coupled to the hose reel to achieve substantially constant tension in the hose during reeling in or reeling out thereof.

In the present invention there is provided a ratchet mounted on the hose reel and having associated therewith a pawl arranged to be tripped into engagement with the ratchet by operation of said spring motor to provide a full trail stop facility for said hose.

According to a further feature of the present invention there is provided a fixed displacement fuel pump coupled to the hose reel via gearing and clutch means to effect a speed limitation during reeling out of the hose.

According to a still further aspect of the invention, the fixed displacement fuel pump is utilized as a motor during the rewinding cycle in order to provide a predetermined hose tensioning during rewind at a speed less than a predetermined value.

In a preferred embodiment of the invention, Negator or Tensator constant tension springs are used to provide the drive giving the predetermined constant tension for reeling in or out with the predetermined minimum response speed for reeling in. With such constant tension drive, the hose tension at full trail will be in excess of the hose tension when fully rewound but this is acceptable, since the greatest tension is required in the full trail position to provide the hose acceleration force when contact is made. Once contact is established, the hose reel effort is only required to overcome the hose tension due to hose drag and small accelerations as the receiver aircraft changes position.

The full trail stop facility is provided by a mechanical brake pawl engaging a ratchet secured to the hose reel. The use of the Tensator spring provides a particularly simple and attractive method of tripping the pawl into engagement by use of a tripping rod timed to operate via the build up of spring layers as the Tensator spring is transferred from the bobbins to the hose reel hub.

To provide the required speed limitation when reeling out a fixed displacement fuel pump is geared to the hose reel through a sprag clutch such that the pump will only rotate when the hose is reeling out. This pump uses the fuel already available in the pod or aircraft, and by delivering the fuel through a simple flow control valve, accurate speed limitation of the hose reel can be reliably achieved, with very little increase in hose tension at speeds less than the predetermined limiting speed. Alternatively, the pump may be replaced by a mechanical centrifugal brake.

When considering the power source required for rewind, it is physically impossible with a mechanical spring balance system, for use in contact, to achieve rewind without introducing additional energy into the system. An air-to-air refuelling system invariably incorporates a powerful fuel pumping system which is not required to operate during the rewind cycle. In the present invention, this power source is used for rewind by using the fixed displacement fuel pump previously referred to, as a motor. Such a device will be termed a "fueldraulic" motor/pump.

The drogue is preferably held in the stowed position by means of the Tensator spring which is always operative, and the brake pawl engaging with the hose drum ratchet. Drogue ejection is effected by a buffer spring and the rewind power will be more than sufficient to compress the spring when the drogue is wound in. The buffer spring value will be determined in conjunction with the Tensator spring which acts in the opposite direction.

A preferred embodiment of the invention will now be described by way of example only, with particular reference to the accompanying drawings, wherein:

FIG. 1 is a diagrammatic illustration of the mechanical drive for the hose incorporated in a refuelling pod;

FIG. 2 is a diagrammatic elevational view of the mechanical drive hose unit;

FIG. 3 is a more detailed view of the Tensator spring motor and gearbox assembly.

Figure 1A:
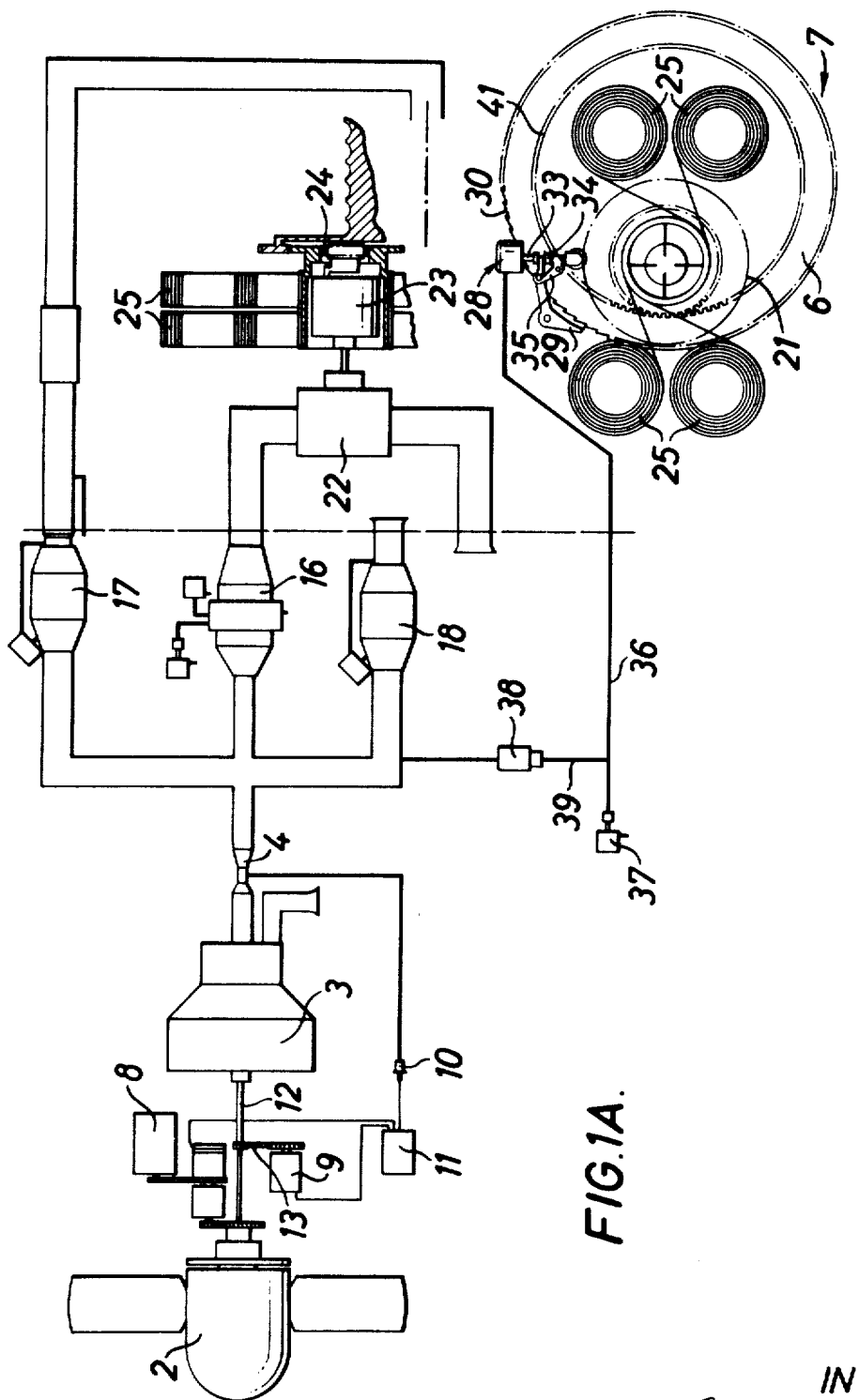
FIG. 1A is a diagram of the aircraft refuelling pod systems of FIG. 1.

Referring to FIGS. 1 and 1A, the hose reel assembly is included in an aircraft refuelling pod 1 which in addition includes a ram air turbine 2 for driving a fuel pump 3 to supply fuel via the venturi 4 to the hose 5 wound on the hose reel 6 of the hose drum unit 7. The power unit is included in Section A of the pod 1 and also includes pitch control mechanism 8, a tachometer 9 and a pressure transducer 10 responsive to fuel pressure at the throat of the venturi 4 and arranged to supply control signals to a control unit 11 coupled to the tachometer 9 and pitch control mechanism 8.

Turbine blade pitch control is achieved by means of the pressure transducer 10 which senses the fuel pressure at the throat of the venturi 4 contained within the fuel tank, and also by means of the tachometer 9 which is driven through the fuel pump drive shaft 12 via gearing 13. Both the transducer 10 and tachometer 9 transmit electrical signals to the control unit 11 which provides an integrated signal to the magnetic powder clutch located in the turbine blade pitch drive control mechanism 8 where the tachometer signal controls the speed of the turbine or the venturi signal controls the speed to give a constant fuel pressure figure at the throat of venturi 4.

The fuel tank assembly comprises that portion of the refuelling pod 1 located between two pressure bulkheads and this portion is designated Section B. The fuel pump 3 protrudes through the front bulkhead 14 to which is attached a suction pipe and an outlet fuel pipe running towards the rear bulkhead 15 and having the venturi tube 4 in line, after which the outlet pipe bifurcates to supply fuel to a hose reel control valve 16 and a refuelling transfer valve 17. These valves although forming a part of the fuel system are attached to the rear bulkhead 15 together with a fuel jettison valve 18 which is connected via a fuel pipe to the fuel supply pipe of the hose reel control valve 16 and the fuel pipe is tapped upstream of the valve 16 to allow a predetermined quantity of fuel to be jettisoned at a controlled rate.

Also located in the fuel tank is a magnetic fuel level switch 19 (FIG. 1) which provides the necessary selections for fuel tank full, mid-level and empty requirements.

The hose reel assembly comprises all the equipment located at the rear end of the refuelling pod 1 and which is attached to the rear bulkhead 15. This equipment includes the hose drum unit 7, the refuelling hose 5, the reception coupling and collapsible drogue 20 and the Tensator spring motor 21 and fueldraulic equipment necessary for "winding" and "trailing" the refuelling hose at controlled speeds and maintaining a constant hose tension during the refuelling operation.

Figure 4:
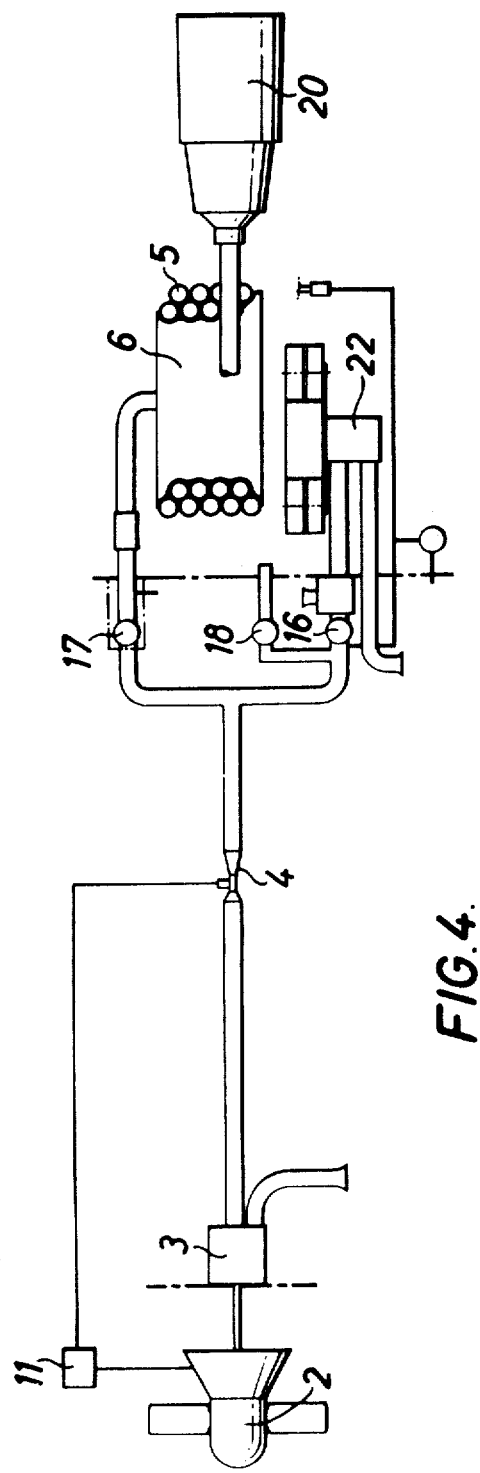
FIG. 4 is a diagram of the fueldraulic motor system.

The power for operating the hose reel 6 in the wind and trail sequences is provided by a fueldraulic motor 22 (FIG. 1A and 4) driving through a two stage reduction, epicyclic gearbox 23 and a spur gear, via a sprag clutch 24 also by the Tensator spring motor 21 driving the spur gear during the refuelling operation.

The fueldraulic motor 22 is supplied with fuel via the hose reel control valve 16 from the fuel pump 3. The valve 16 is a dual-purpose valve and during a wind sequence, one side of the control valve 16 opens permitting a predetermined volume of fuel to flow at a controlled pressure to power the hose reel and provide a nominal wind-in speed. During the trail mode, the wind side of the valve 16 is closed and the other side is opened and in the trail mode, the fueldraulic motor 22 functions as a pump withdrawing fuel from the fuel tank and returning it via the control valve 16 which in the trail mode functions as a flow control valve thereby limiting the trail speed to a maximum predetermined rate. During the trail mode, the Tensator spring motor 21 is powered by the hose reel and transfers the Tensator springs 25 from their bobbins 26 to the hub 27 of the drive unit, thus storing sufficient power for maintaining a constant hose tension and hose response during the refuelling operation.

The drive unit consists of the fueldraulic motor 22, the epicyclic gearbox 23, the sprag clutch 24, spur gear, and eight Tensator springs 25 and spring bobbins 26. The epicyclic gearbox 23 forms the hub of the drive unit containing the two stage reduction gearing, sprag clutch and spur gear for driving the hose reel. Secured to one end of the gearbox is the spring bobbin mounting frame and the fueldraulic motor 22.

Referring to FIGS. 1A and 3, an arrester mechanism 27 is provided on the hose reel 6 for arresting the hose drum at the "full trail" position when stowed or in the event of an emergency. The arrester mechanism 27 includes operating mechanism 28 and a spring-loaded pawl 29 arranged to engage a ratchet wheel 30 on the hose reel 6. The operating mechanism 28 comprises a fuel chamber 31, a spring-loaded bellows 32, an operating rod 33 with a roller 34 attached thereto and a ratchet release yoke 35. The ratchet release yoke 35 is arranged such as to control the actuation of the ratchet pawl 29 via the operating mechanism 28. The fuel chamber 31 is connected to the fuel line for powering the hose reel 6 via a small fuel pipe 36 which is tee-d into a solenoid-operated valve 37 connected to the fuel tank; the fuel line being tapped upstream of the hose reel control valve 16. A pressure relief valve 38 is located in the fuel pipe 39 linking the fuel line to the valve 16 and the small fuel pipe 36.

The operation of the arrester mechanism is such that with the hose 5 in the "stowed" position, the arrester mechanism solenoid valve 37 will be de-energized to the OPEN state allowing the evacuation of fuel pressure from the fuel chamber 31 thereby allowing the spring-loaded bellows 32 and operating rod 33 to move vertically and allowing the pawl 29 to rotate via its associated torsion spring and engage with the hose reel ratchet wheel 30. During the wind mode, the arrester mechanism solenoid valve 37 is energized to the CLOSED state allowing a nominal fuel pressure to be applied to the top of the spring-loaded bellows 32 and operating rod 33 of the operating mechanism 28. This applied pressure overcomes the spring-loading permitting the bellows and rod to move downwardly, thereby actuating the ratchet release yoke 35 into engagement with the pawl 29 to disengage the pawl 29 from the teeth of the ratchet wheel 30. (Note that during the sequence, the hose reel control valve is in the wind selection position which releases the load applied to the arrester mechanism prior to the pawl 29 becoming disengaged from the teeth of the ratchet wheel 30).

To permit the selection of the hose reel fuel transfer valve and the flow control valve solenoid on the hose reel control valve 16, a separate switching unit 30 is located on one side of the hose reel assembly. This switching unit 40 (FIG. 3) consists of reed type switch contacts and a magnet carrying operating rod to which a roller is secured. The switch contacts are so arranged for the fuel transfer valve to be in the correct selection when a receiver aircraft makes contact on the reception coupling and drogue 20 (FIG. 1) and the flow control solenoid to be deenergized when the hose 5 is a predetermined distance from the full trail position. The operating rod 33 is actuated via the transfer of the Tensator springs 25 on the drive unit from their bobbins 26 to the drive unit hub in the trail mode and vice versa in the wind mode.

Thus, to arrest the refuelling hose at the full trail position, it is first necessary to reduce the trailing speed of the hose prior to arresting the hose reel 6, to prevent excessive loading of the mechanism. This is achieved by the switch unit 40 (FIG. 3) which is operated via the transfer of the Tensator springs from their bobbins to the hub of the drive unit in the trail sequence, actuating the switch at approximately 5 feet from the full trail position. The actuation of switch 40 de-energizes the solenoid on the flow control side of the hose reel control valve 16, thereby closing the valve and interrupting the flow of fuel, which reduces the hose trailing speed. At 1 foot from the full trail position of the hose, the arrester operating mechanism is actuated in a similar manner in that the roller 34 attached to the bellows 32 via the operating rod 33 makes with the Tensator springs that are being transferred to the hub of the drive unit, and is moved in a vertical direction, releasing the yoke 35 and permitting the ratchet pawl 29 to rotate with a snap action and engage with the hose reel ratchet wheel 30.

In the event of an electrical failure, the arrester mechanism is so designed to prevent further rotation of the hose reel in the trail mode. Should such a failure occur, the solenoids controlling the flow control side of the hose reel control valve 16, and the arrester mechanism are selected CLOSED and OPEN respectively. With these selections, the arresting of the hose reel 6 is achieved in a similar manner to that described above for the full trail sequence where the hose reel 6 reduces its speed of rotation, and the bellows 32 and operating rod 33 of the operating mechanism 28 is actuated via its associated spring, and the fuel pressure within the fuel chamber 31 is evacuated via the open arrester mechanism valve 37 to actuate the yoke 35, thereby permitting the pawl 29 to engage the ratchet wheel 30 with a snap action to arrest the rotation thereof.

The hose drum of the hose reel assembly 7 accommodates a 50-feet length of hose 5 and the assembly consists of a hose drum barrel, self sealing adaptor, hose release mechanism, slip ring assembly, internal fuel pipe, rotating seal and a combined internal drive gear 41 and ratchet wheel 30. The combined internal gear 41 and ratchet wheel 30 are located on the hose reel 6 in such a position as to permit the meshing of the internal gear 41 to the spur gear of the drive unit, and the engagement of the ratchet pawl 29 with the ratchet wheel 30 as described above.

From the above, it will be seen that a full trail stop facility is provided by the mechanical brake pawl engaging in the teeth of the ratchet wheel secured to the hose reel. Use of the Tensator spring provides a simple method of tripping the pawl into engagement by the use of the bellows and associated operating rod timed to operate via the build up of the spring layers, as the Tensator spring is transferred from the bobbins to the hose reel hub.

By gearing a fixed displacement fuel pump (the fueldraulic motor) to the hose reel via a spring clutch, the pump will only rotate when the hose reel is reeling out. This pump uses the fuel already available in the refuelling pod, and by delivering the fuel through a simple flow control valve, accurate speed limitation of the hose reel can be achieved with very little increase in hose tension at speeds less than the limiting speed.

The fixed displacement pump is also used as a motor to provide rewind power. The machine is only required to motor in the wind sense and hence the sprag clutch and gearing required for the trail speed limitation mode are equally applicable to the rewind mode. The mechanically operated hose reel thus employs the fuel pump to provide the necessary power to the hose reel motor by using the main fuel line between the fuel pump and hose reel into which is tapped the reel's motor feed pipe. The power supplied to the hose reel motor is used only for the rewind sequence with the fuel contained within the fuel tank being used in the trail sequence.

We claim:

1. An air-to-air refueling apparatus comprising a hose reel, a refueling hose adapted to be convoluted on said reel, a drogue member at the terminal end of said hose and a constant tension spring motor means coupled to said hose reel to be wound and unwound responsive to reeling in and reeling out thereof, whereby a substantially constant tension is maintained in said hose in the course of said reeling in and reeling out of said hose, said motor, in addition, storing energy derived from the pay out of said drogue and utilizing said stored energy in said reeling in of said hose.

2. Air-to-air refuelling hose reel apparatus as claimed in claim 1 including arresting means associated with the hose reel for providing a full trail stop facility for said hose, and switch means for activating said arresting means, said switch means being responsive to operation of said spring motor.

3. Apparatus as claimed in claim 2 including hydraulic motor means connected to said reel for rewinding the latter, said hose reel arresting means including a ratchet wheel on said hose reel, a spring-loaded pawl member shiftable into and out of engagement with the teeth of said ratchet wheel, and operating means for shifting said pawl between said engaged and disengaged positions with said ratchet wheel, said operating means including an expansion chamber connected to sense hydraulic pressure in said motor means and retract said pawl from said wheel responsive to winding pressures in said motor means.

4. Apparatus as claimed in claim 3 wherein the operating mechanism includes a spring-loaded bellows within said fuel chamber, an operating rod connected to said bellows and having a roller thereon and a yoke extending between the operating rod and the pawl and wherein the spring motor includes a plurality of Tensator springs which during the trail mode are transferred from associated bobbins to the hub of the hose reel drive unit such that when the fuel supply to the fuel chamber of the operating mechanism is terminated during the trail mode the roller on the operating rod engages the Tensator springs to release the yoke and permit the pawl to be moved into engagement with a tooth of the ratchet wheel.

5. Apparatus as claimed in claim 1 and including a fixed displacement fuel pump, drive means including a gear and clutch for operatively connecting said reel and said pump during reeling out of said hose, and hose reel control valve means connected to meter the output of said pump for effecting speed limitation of said reel during reeling out.

6. Apparatus as claimed in claim 5 wherein the fixed displacement fuel pump is utilized as a motor during rewinding of the hose reel to provide a predetermined hose tensioning during rewind at a speed less than a predetermined value.

7. Apparatus as claimed in claim 5 wherein the hose reel control valve comprises a first part arranged to be opened during a hose reel wind mode to permit a predetermined volume of fuel to flow to the displacement pump to power the hose reel and a second part arranged to be opened during a hose reel trail mode to allow the displacement pump to withdraw fuel from a fuel tank and return said fuel via the hose reel control valve to limit the hose trail speed to a predetermined maximum rate.

8. The device of claim 5 wherein said fuel pump is connected to said main fuel source and operates as a motor in the rewind mode of said reel.

* * * * *